(12) United States Patent
Matsuda et al.

(10) Patent No.: US 11,067,154 B2
(45) Date of Patent: Jul. 20, 2021

(54) TOROIDAL CONTINUOUSLY VARIABLE TRANSMISSION

(71) Applicant: KAWASAKI JUKOGYO KABUSHIKI KAISHA, Kobe (JP)

(72) Inventors: Kippei Matsuda, Kobe (JP); Hideyuki Imai, Akashi (JP); Kenichiro Tanaka, Kobe (JP); Tetsuya Matsuoka, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 164 days.

(21) Appl. No.: 16/345,051

(22) PCT Filed: Oct. 24, 2017

(86) PCT No.: PCT/JP2017/038241
§ 371 (c)(1),
(2) Date: Apr. 25, 2019

(87) PCT Pub. No.: WO2018/079505
PCT Pub. Date: May 3, 2018

(65) Prior Publication Data
US 2019/0277374 A1  Sep. 12, 2019

(30) Foreign Application Priority Data
Oct. 27, 2016  (JP) .............................. JP2016-210206

(51) Int. Cl.
*F16H 15/38* (2006.01)
(52) U.S. Cl.
CPC .................... *F16H 15/38* (2013.01)

(58) Field of Classification Search
CPC .......... F16H 15/38; F16H 15/32; F16H 15/34; F16H 2015/386
See application file for complete search history.

(56) References Cited

U.S. PATENT DOCUMENTS 2,292,066 A * 8/1942 Erban ..................... F16H 15/38
475/214
3,163,051 A   12/1964 Kraus
5,027,668 A * 7/1991 Nakano ................... F16H 57/04
476/8

(Continued)

FOREIGN PATENT DOCUMENTS

| JP | 2005-214373 A | 8/2005 |
| JP | 2015-075185 A | 4/2015 |

*Primary Examiner* — David M Fenstermacher
(74) *Attorney, Agent, or Firm* — Sughrue Mion, PLLC

(57) ABSTRACT

A toroidal continuously variable transmission includes a first disc and a second disc disposed so that the first disc and the second disc are rotatable around a common rotational axis line, the first disc and the second disc facing each other; a power roller which is tiltably disposed between the first disc and the second disc; a pressing device of a loading cam type, the pressing device including a cam plate which is rotatable around the rotational axis line, and a roller unit including at least one roller sandwiched between a cam surface of the second disc and a cam surface of the cam plate; and a cam plate support supporting a back surface of the cam plate, the back surface being opposite to the cam surface of the cam plate, at a radial position conforming to a radial position of at least a portion of the roller unit.

13 Claims, 7 Drawing Sheets

(56) References Cited

U.S. PATENT DOCUMENTS

| | | | | |
|---|---|---|---|---|
| 5,027,669 | A  * | 7/1991 | Nakano | F16H 15/38 476/41 |
| 2002/0058562 | A1* | 5/2002 | Ishikawa | F16H 15/38 475/216 |
| 2003/0017907 | A1* | 1/2003 | Nishii | F16H 57/043 476/40 |
| 2003/0132051 | A1* | 7/2003 | Nishii | F16H 15/38 180/364 |
| 2004/0102285 | A1* | 5/2004 | Kato | F16H 15/38 476/46 |
| 2005/0064985 | A1* | 3/2005 | Imanishi | F16H 15/38 476/8 |
| 2013/0035200 | A1* | 2/2013 | Noji | F16H 63/065 476/42 |
| 2016/0178036 | A1* | 6/2016 | Kita | F16H 15/38 476/10 |
| 2016/0238112 | A1* | 8/2016 | Kishida | F16H 15/38 |
| 2017/0114876 | A1* | 4/2017 | Fukuda | F16D 1/09 |
| 2019/0277374 | A1* | 9/2019 | Matsuda | F16H 15/38 |
| 2019/0277375 | A1* | 9/2019 | Matsuda | F16H 15/38 |

* cited by examiner

TOROIDAL CONTINUOUSLY VARIABLE TRANSMISSION

CROSS REFERENCE TO RELATED APPLICATIONS

This application is a National Stage of International Application No. PCT/JP2017/038241 filed Oct. 24, 2017, claiming priority based on Japanese Patent Application No. 2016-210206 filed Oct. 27, 2016.

TECHNICAL FIELD

The present invention relates to a toroidal continuously variable transmission (toroidal CVT).

BACKGROUND ART

In a toroidal continuously variable transmission (toroidal CVT), power rollers are disposed between an input disc and an output disc, and a transmission ratio (transmission gear ratio) is continuously changed by tilting the power rollers. A toroidal CVT disclosed in Patent Literature 1 is provided with a pressing device of a loading cam type, including a cam plate which is rotatable around a common axis around which the discs are rotatable, and a roller group comprised of a plurality of rollers sandwiched between the disc and the cam plate and arranged in a radial direction. In the pressing device of the loading cam type, with an increase in transmitted torque, the disc is pressed (pushed) away from the cam plate by a cam action. Thus, the input disc and the output disc are biased to become close to each other. In this way, the power rollers are sandwiched with a sufficient contact pressure.

In a case where the cam plate is deflected and warped back by a reaction force from the roller, while high torque is generated, the cam plate is concentratively pressed (pushed) against the roller located radially inward. As a result, the life of this roller is reduced. In addition, torque transmission performance is degraded. As a solution to this, in the pressing device disclosed in Patent Literature 1, the cam surface of at least one of the cam plate and the disc is formed to have a taper shape which is inclined (slanted) in a direction away from the rollers, toward a radially inward side. This makes it possible to prevent a situation in which the roller located radially inward bears a more load all the time.

CITATION LIST

Patent Literature

Patent Literature 1: Japanese Laid-Open Patent Application Publication No. 2005-214373

SUMMARY OF INVENTION

Technical Problem

In the configuration disclosed in Patent Literature 1, the roller located radially outward bears a load while low torque is generated, whereas the roller located radially inward bears a load while high torque is generated. For this reason, the contact pressure between the cam plate and the roller group is non-uniform (uneven) in a radial direction. Therefore, there is a room for improvement in extension of the life and the torque transmission performance. Further, it is necessary to precisely manage a taper angle of the cam surface when the discs and the cam plate are manufactured.

In view of the above, an object of the present invention is to provide a toroidal continuously variable transmission (toroidal CVT) including a pressing device of a loading cam type, which can be manufactured easily and has a long life and stable torque transmission performance.

Solution to Problem

According to an aspect of the present invention, a toroidal continuously variable transmission comprises: a first disc and a second disc disposed so that the first disc and the second disc are rotatable around a common rotational axis line, the first disc and the second disc facing each other; a power roller which is tiltably disposed between the first disc and the second disc; a pressing device of a loading cam type, the pressing device including a cam plate which is rotatable around the rotational axis line, and a roller unit including at least one roller sandwiched between a cam surface of the second disc and a cam surface of the cam plate; and a cam plate support supporting a back surface of the cam plate, the back surface being opposite to the cam surface of the cam plate, at a radial position conforming to a radial position of at least a portion of the roller unit.

In accordance with this configuration, the cam plate support properly receives a reaction force from the roller unit, and the deflection (flexure) of the cam plate is suppressed. Therefore, a contact pressure generated between the cam plate and the roller unit can be kept uniform in the radial direction and a local abrasion (wear) can be prevented. In addition, it becomes possible to prevent a situation in which a part of the roller unit becomes apart from the cam plate. Since the cam plate support supports the cam plate from the back surface side, a simple configuration can be realized. As a result, it becomes possible to provide a toroidal continuously variable transmission (toroidal CVT) including the pressing device of a loading cam type, which can be manufactured easily and has a long life and stable torque transmission performance.

The cam plate support may be separate from the cam plate, and the cam plate support may be configured to contact the back surface of the cam plate so that the cam plate support can become apart from the back surface of the cam plate.

In accordance with this configuration, the cam plate support is not fixed to the cam plate, and a bending stress is not easily transmitted between the cam plate support and the cam plate. Therefore, it is not necessary to manufacture the cam plate support or the like with a highly stiff structure, or to reinforce the cam plate support or the like. This facilitates reduction of a weight.

The portion of the roller unit may be a center portion of the roller unit.

In accordance with this configuration, a contact pressure generated between the cam plate and the roller unit can be suitably made uniform.

The toroidal continuously variable transmission may further comprise: a preload spring which biases the cam plate toward the roller unit in a direction of the rotational axis line, wherein the cam plate support may be disposed between the cam plate and the preload spring.

In accordance with this configuration, the biasing force applied by the preload spring is not directly transmitted to the cam plate and transmitted to the cam plate via the cam plate support. This basing force is applied to the back surface of the cam plate. Therefore, it becomes possible to suppress the tilting of the cam plate by the biasing force applied by the preload spring. This leads to uniformity of a contact pressure generated between the cam plate and the roller unit.

Advantageous Effects of Invention

In accordance with the present invention, it becomes possible to provide a toroidal continuously variable transmission (toroidal CVT) including a pressing device of a loading cam type, which can be manufactured easily and has a long life and stable torque transmission performance.

DESCRIPTION OF EMBODIMENTS

Hereinafter, the embodiments of the present invention will be described with reference to the drawings.

Embodiment 1

Figure 1:
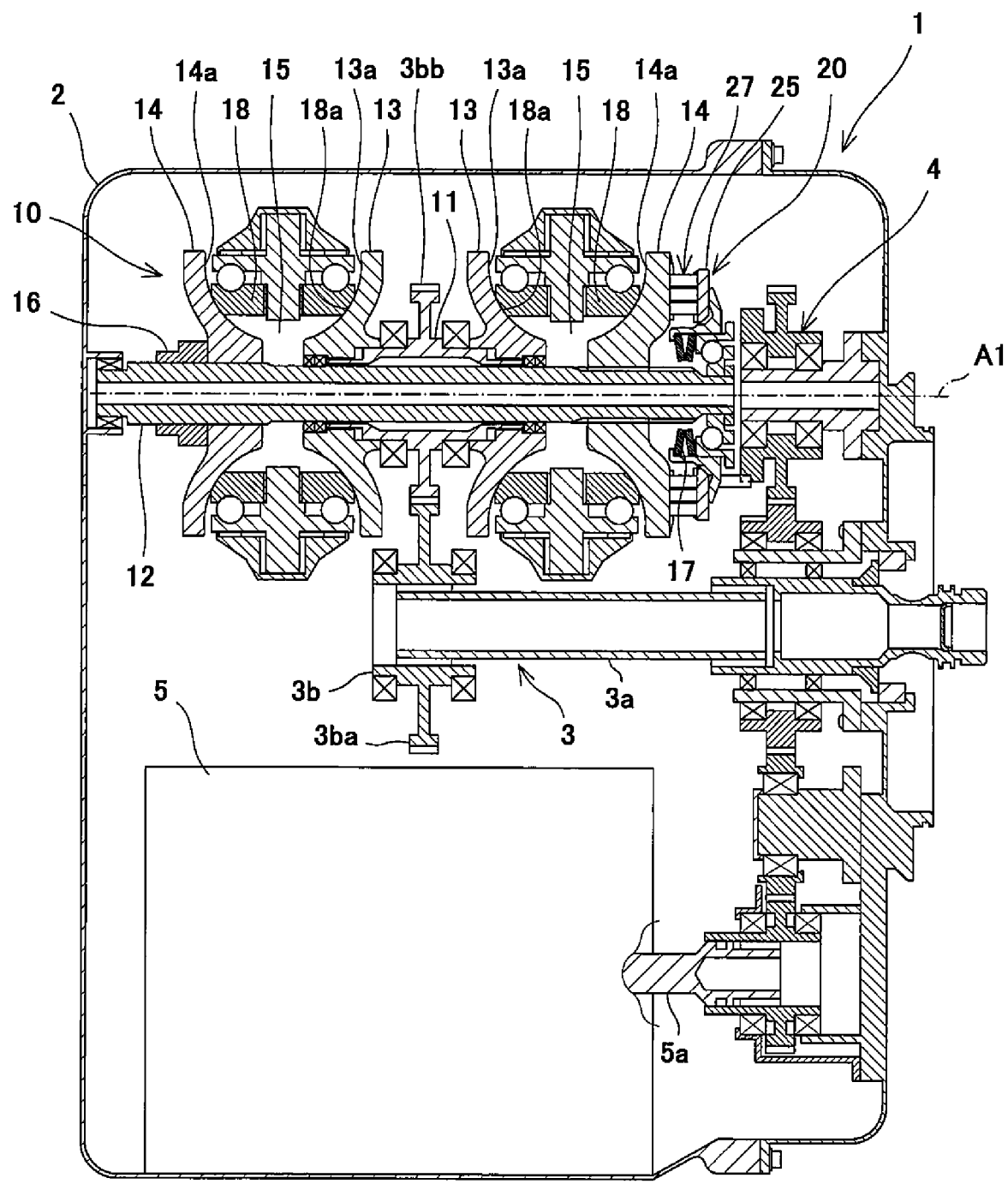
FIG. 1 is a cross-sectional view showing an integrated drive generator (IDG) including a toroidal continuously variable transmission (toroidal CVT) according to Embodiment 1.

FIG. 1 is a cross-sectional view showing an integrated drive generator 1 including a toroidal continuously variable transmission (toroidal CVT) 10 according to the embodiment. As shown in FIG. 1, the integrated drive generator 1 (hereinafter will be referred to as "IDG") is used in an AC power supply of an aircraft, and includes a casing 2 mounted on an engine of the aircraft. In the casing 2, an input mechanism 3, the toroidal CVT 10 (hereinafter will be referred to as "transmission"), a driving force transmission mechanism 4, and an electric power generator 5 are accommodated. Note that the toroidal CVT 10 is not limited to a part of the IDG, and its use is not limited to the aircraft.

The transmission 10 includes a transmission input shaft 11 and a transmission output shaft 12 which are placed coaxially and are relatively rotatable (hereinafter, the axis lines of the shafts 11 and 12 will be referred to as "rotational axis line A1"). The transmission input shaft 11 is connected to an engine rotary shaft (not shown) via the input mechanism 3. The input mechanism 3 includes a device input shaft 3a to which a rotational driving force taken out of the engine rotary shaft is input, and a pair of gears 3b which transmit the rotation of the device input shaft 3a to the transmission input shaft 11. The pair of gears 3b include a gear 3ba which is rotatable together with the device input shaft 3a, and a gear 3bb which is rotatable together with the transmission input shaft 11. The transmission output shaft 12 is connected to an electric power generator input shaft 5a of the electric power generator 5 via a driving force transmission mechanism 4 (e.g., gear train).

The rotational driving force taken out of the engine rotary shaft is input to the transmission input shaft 11 via the input mechanism 3. The transmission 10 changes the speed of the rotation of the transmission input shaft 11 and outputs the rotation to the transmission output shaft 12. The rotational driving force is transmitted from the transmission output shaft 12 to the electric power generator input shaft 5a via the driving force transmission mechanism 4. When the electric power generator input shaft 5a is driven to rotate, the electric power generator 5 generates AC power. A transmission ratio (transmission gear ratio) of the transmission 10 is continuously changed so that the rotation speed of the electric power generator input shaft 5a is kept at a proper value (value corresponding to a frequency which is suitable for the operations of electric components in the aircraft), irrespective of a change of the rotation speed of the engine rotary shaft.

The transmission 10 is, for example, a half toroidal and double cavity CVT. The transmission 10 includes two sets of input disc 13 (first disc) and output disc 14 (second disc). The input discs 13 are fitted to the transmission input shaft 11 so that the input discs 13 are rotatable together with the transmission input shaft 11. The output discs 14 are fitted to the transmission output shaft 12 so that the output discs 14 are rotatable together with the transmission output shaft 12. The two sets of discs 13, 14 are disposed at locations that are adjacent to each other in the direction of the rotational axis line A1 so that the discs 13, 14 are rotatable around the rotational axis line A1. The input disc 13 and the output disc 14 are disposed to face each other in the direction of the rotational axis line A1 of the transmission 10. The input disc 13 and the output disc 14 have concave contact surfaces 13a, 14a, respectively, facing each other. The input disc 13 and the output disc 14 form an annular cavity 15 around the rotational axis line A1 by the contact surfaces 13a, 14a. Note that the transmission is not limited to a transmission with a double cavity configuration. The transmission may be, for example, a transmission with a single cavity configuration.

The transmission 10 has, for example, a center input configuration. The transmission output shaft 12 is inserted into the transmission input shaft 11 and protrudes from the both sides of the transmission input shaft 11. The two input discs 13 are disposed back-to-back on the transmission input shaft 11. The two output discs 14 are disposed outward of the two input discs 13 in the direction of the rotational axis line A1. The gear 3bb which is rotatable together with the transmission input shaft 11 is provided on the outer peripheral surface of the transmission input shaft 11. The gear 3bb is disposed between the two input discs 13. Note that the configuration of the transmission is not limited to the center input configuration, and may be, for example, a center output configuration. In the case of the center output configuration, a pressing device 20 and a cam plate support 28 which will be described later may be provided on the input disc 13 side.

Figure 2:
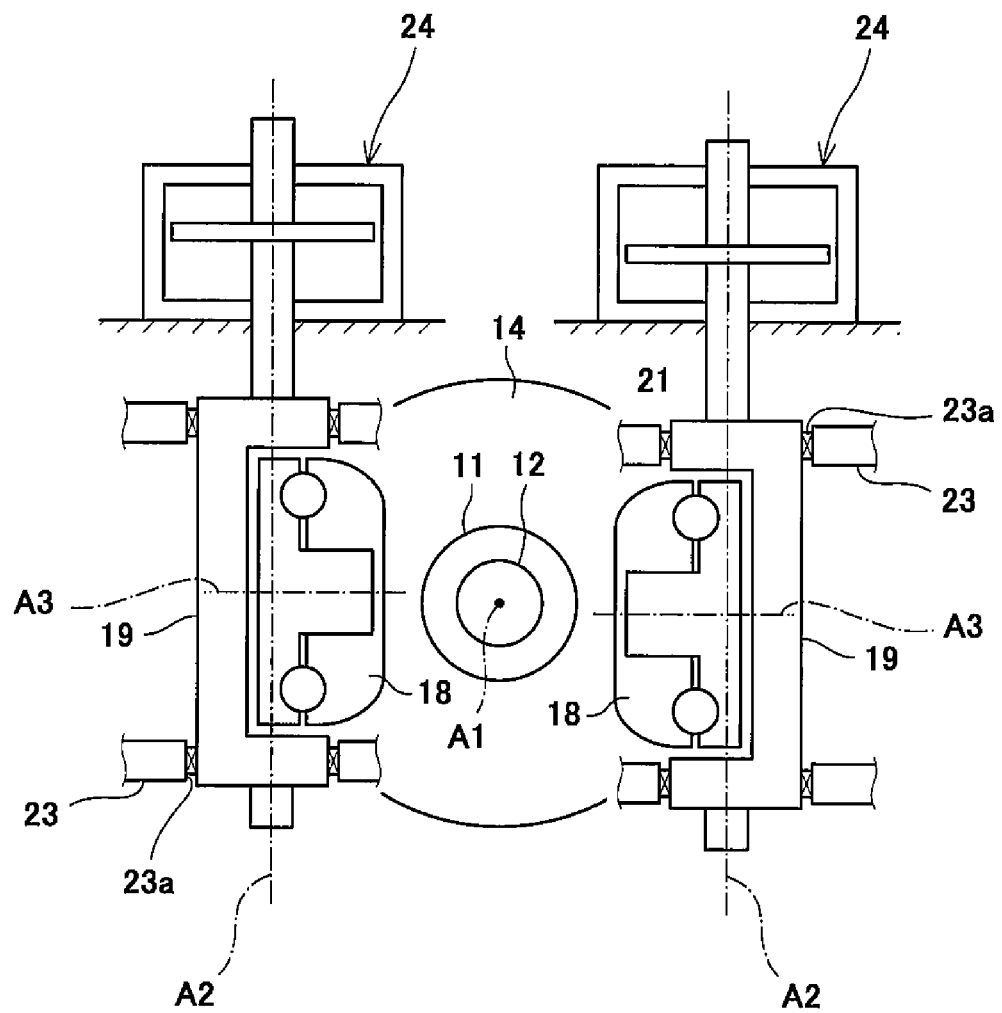
FIG. 2 is a cross-sectional view showing the toroidal CVT of FIG. 1, when viewed from a direction of a rotational axis line.

The output disc 14 on a first side (one side) is fastened to the transmission output shaft 12 by a fastening member 16. The output disc 14 on a second side (the other side) is biased toward the input disc 13 by a preload spring 17 (e.g., disc spring). During the rotation, the output disc 14 on the second side is biased toward the input disc 13 by the pressing device 20. The pressing device 20 is a loading cam type pressing device. The output disc 14 is connected to the driving force transmission mechanism 4 via the pressing device 20 so that the driving force is transmitted from the output disc 14 to the driving force transmission mechanism 4. The transmission 10 includes a plurality of power rollers 18 disposed within the cavity 15 and a plurality of trunnions 19 (see FIG. 2) which support the plurality of power rollers 18, respectively so that the plurality of power rollers 18 are tiltable, FIG. 2 is a cross-sectional view showing the transmission 10 of FIG. 1, when viewed from the direction of the rotational axis line A1. As shown in FIG. 2, the trunnions 19 are supported by the casing 2 so that each of the trunnions 19 is tiltable around a tilt motion axis line A2 and displaceable in the direction of the tilt motion axis line A2. The tilt motion axis line A2 is skew with respect to the rotational axis line A1. The power rollers 18 are supported by the trunnions 19, respectively so that each of the power rollers 18 is rotatable around a rotational axis line A3 perpendicular to the tilt motion axis line A2.

Each of the trunnions 19 is rotatably fitted into throughholes 23*a* of yokes 23 secured to the casing 2. The trunnions 19 are supported by the casing 2 via the yokes 23 so that each of the trunnions 19 is tiltable around the tilt motion axis line A2 and displaceable in the direction of the tilt motion axis line A2. The trunnions 19 are connected to hydraulic driving mechanisms 24, respectively. Each of the hydraulic driving mechanisms 24 is configured to reciprocatingly displace the trunnion 19 together with the power roller 18 in the direction of the tilt motion axis line A2.

As shown in FIGS. 1 and 2, when the input discs 13 are driven to rotate, the output discs 14 are driven to rotate via the power rollers 18, and the transmission output shaft 12 is driven to rotate. When the trunnions 19 and the power rollers 18 are displaced in the direction of the tilt motion axis lines A2, angles (hereinafter will be referred to as "tilt motion angles") of the power rollers 18 around the tilt motion axis lines A2 are changed, and the transmission ratio (transmission gear ratio) of the transmission 10 is continuously changed based on the tilt motion angles.

The power rollers 18 are sandwiched between a contact surface 13*a* of the input disc 13 and a contact surface 14*a* of the output disc 14 in a state in which each of the power rollers 18 is tiltable around the tilt motion axis line A2. The power rollers 18 change the speed of the rotational driving force of the input disc 13 with the transmission ratio corresponding to the tilt motion angles, and transmit the rotational driving force to the output disc 14. When the rotation torque of the output disc 14 is increased, the pressing device 20 presses (pushes) the output disc 14 so that the output disc 14 approaches the input disc 13. Thus, a pressing force with which the power rollers 18 are sandwiched between the input disc 13 and the output disc 14 is increased.

Figure 3:
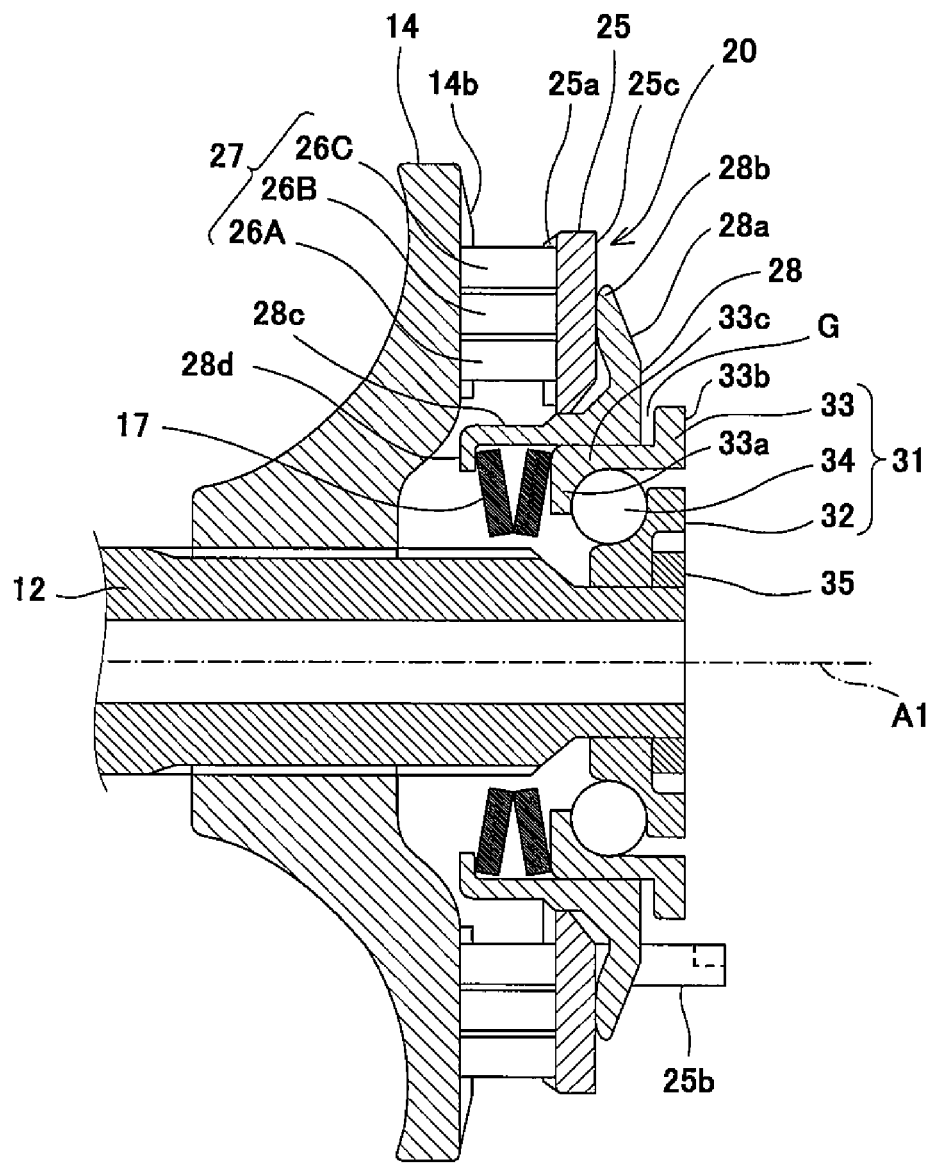
FIG. 3 is an enlarged view showing major components (constituents) of the toroidal CVT of FIG. 1.

FIG. 3 is an enlarged view showing major components (constituents) of the transmission 10 of FIG. 1. As shown in FIG. 3, the output disc 14 has a cam surface 14*b* on a side opposite to the input disc 13. The pressing device 20 is rotatably placed coaxially with the output disc 14. The pressing device 20 includes a cam plate 25 which is rotatably disposed coaxially with the output disc 14, the cam plate 25 being an annular plate having a cam surface 25*a* facing the cam surface 14*b* of the output disc 14, and a roller unit 27 (roller group) comprised of a plurality of (e.g., three) rollers 26A to 26C sandwiched between the output disc 14 and a cam plate 25, the rollers 26A to 26C being arranged in a radial direction perpendicular (orthogonal) to the rotational axis line A1. The cam plate 25 is externally fitted to a tubular portion 28*c* of the cam plate support 28 which will be described later. The cam plate 25 includes a dog 25*b* protruding outward in the direction of the rotational axis line A1. The dog 25*b* is engaged with the driving force transmission mechanism 4 so that the driving force can be transmitted from the dog 25*b* to the driving force transmission mechanism 4. Note that the engagement between the cam plate 25 and the driving force transmission mechanism 4 is not limited to dog clutch engagement so long as the driving force can be transmitted from the cam plate 25 to the driving force transmission mechanism 4. For example, the engagement between the cam plate 25 and the driving force transmission mechanism 4 may be spline connection.

The cam surface 14*b* of the output disc 14 and the cam surface 25*a* of the cam plate 25, facing each other, are formed with smooth concave and convex portions in the circumferential direction. The rollers 26A to 26C are sandwiched between the cam surfaces 14*b*, 25*a* in the direction of the rotational axis line A1 and in the circumferential direction around the rotational axis line A1. When rotation torque of the output disc 14 and the cam plate 25 is increased, the output disc 14 is pressed (pushed) in a direction away from the cam plate 25 by a cam action.

The cam plate 25 is supported by the cam plate support 28 which is separate from the cam plate 25. Alternatively, the cam plate 25 and the cam plate support 28 may be integrated instead of being separate from each other. The cam plate and the cam plate support may be formed of the same material or different materials. In a case where the cam plate and the cam plate support are formed of different materials, the cam plate support 28 is formed of a material with a specific weight (gravity) lower than that of the cam plate 25. The cam plate support 28 supports a back surface 25*c* of the cam plate 25, the back surface 25*c* being opposite to the cam surface 25*a*, at a radial position conforming to that of a portion of the roller unit 27. The cam plate support 28 is disposed between the cam plate 25 and a preload spring 17. The preload spring 17 and a thrust bearing 31 are disposed between the cam plate support 28 and the transmission output shaft 12 in the direction of the rotational axis line A1. Specifically, the cam plate support 28 is provided so that a movement with a predetermined amount or more to an outward side in the direction of the rotational axis line A1 with respect to the transmission output shaft 12 which is a driving force transmission shaft is restricted. The "thrust bearing" is defined as all kinds of bearings which receive a thrust force. The thrust bearing may be a bearing which receives a radial force as well as the thrust force. For example, the thrust bearing may be a roller bearing.

The cam plate support 28 includes an arm portion 28*a* extending in the radial direction along the back surface 25*c* of the cam plate 25 in a state in which the arm portion 28*a* is apart from the back surface 25*c* in the direction of the rotational axis line A1, a contact portion 28*b* provided at a radially outer portion of the arm portion 28*a*, the contact portion 28*b* being configured to contact the back surface 25*c* of the cam plate 25 so that the contact portion 28*b* can become apart from the back surface 25*c*, the tubular portion 28*c* extending along the rotational axis line A1 from the radially inner end portion of the arm portion 28*a* toward the output disc 14, and a flange portion 28*d* protruding radially inward from the tubular portion 28*c*. In the present embodiment, the flange portion 28*d* is provided at an end portion of the tubular portion 28*c*, the end portion being closer to the output disc 14. However, the flange portion 28*d* need not be provided at the end portion of the tubular portion 28*c*. The flange portion 28*d* may be provided at the tubular portion 28*cb* at a location that is in the vicinity of a center of the tubular portion 28*cb* in the direction of the rotational axis line A1. Further, the tubular portion 28c may be omitted. In this case, the flange portion 28d is provided at a radially inner portion of the arm portion 28a.

The contact portion 28b of the cam plate support 28 is configured to surface-contact the back surface 25c of the cam plate 25, at a radial position conforming to that of the center portion of the roller unit 27. In the present embodiment, the contact portion 28b of the cam plate support 28 is configured to contact the back surface 25c of the cam plate 25 at a location where the contact portion 28b overlaps with the center roller 26B of the three rollers 26A to 26C arranged in the radial direction, when viewed from the direction of the rotational axis line A1. Note that the shape of the contact portion 28b of the cam plate support 28 is not limited to the shape of FIG. 3. For example, the contact portion 28b of the cam plate support 28 may have a shape configured to linearly contact the back surface 25c of the cam plate 25. Further, the contact portion 28b of the cam plate support 28 may be configured to contact the back surface 25c of the cam plate 25 at a radial position different from that of the center portion of the roller unit 27.

The thrust bearing 31 is externally fitted to the end portion of the transmission output shaft 12. The thrust bearing 31 is disposed between the transmission output shaft 12 and the preload spring 17. The thrust bearing 31 includes an inner race 32, an outer race 33, and rolling elements 34 disposed between the inner race 32 and the outer race 33. The inner race 32 is fitted to the transmission output shaft 12 so that movement of the inner race 32 to an outward side in the direction of the rotational axis line A1 with respect to the transmission output shaft 12 is restricted. For example, the inner race 32 is positioned with respect to the rotational axis line A1 by a nut 35 secured to the end portion of the transmission output shaft 12 and forming a portion of the driving force transmission shaft. Alternatively, the inner race 32 may be integrated with the transmission output shaft 12. The position of the outer race 33 of the thrust bearing 31 in the direction of the rotational axis line A1 at least partially overlaps with that of the arm portion 28a of the cam plate support 28. In this way, a configuration which is compact in the direction of the rotational axis line A1 is realized.

The preload spring 17 is disposed between the cam plate support 28 and the thrust bearing 31. The preload spring 17 applies a preload to the output disc 14 via the cam plate support 28 and the pressing device 20, in the direction of the rotational axis line A1 so that the output disc 14 is pressed (pushed) toward the input disc 13. More specifically, the preload spring 17 is sandwiched between the flange portion 28d of the cam plate support 28 and the outer race 33 of the thrust bearing 31, and compressed in the direction of the rotational axis line A1. The position of the preload spring 17 in the direction of the rotational axis line A1 overlaps with those of the rollers 26A to 26C.

The cam plate support 28 is placed to be displaceable in the direction of the rotational axis line A1 with respect to the thrust bearing 31. A gap G is formed between the cam plate support 28 and the thrust bearing 31, in the direction of the rotational axis line A1. In the present embodiment, the gap G is formed between the arm portion 28a of the cam plate support 28 and the outer race 33 of the thrust bearing 31, in the direction of the rotational axis line A1. The outer race 33 includes a spring contact portion 33a which contacts the preload spring 17, and a stopper portion 33b facing the arm portion 28a of the cam plate support 28 in the direction of the rotational axis line A1 with the gap G between them. The spring contact portion 33a is internally fitted to the tubular portion 28c of the cam plate support 28. The stopper portion 33b protrudes radially outward from the outer portion of the spring contact portion 33a in the direction of the rotational axis line A1.

In the present embodiment, the outer race 33 includes a ring portion 33c supporting the rolling elements 34 from a radially outer side. The spring contact portion 33a protrudes radially inward from an end portion of the ring portion 33c, the end portion being closer to the preload spring 17. The stopper portion 33b protrudes radially outward from the ring portion 33c, at a location that is more distant from the preload spring 17 than the spring contact portion 33a in the direction of the rotational axis line A1. In the example of FIG. 3, the stopper portion 33b is provided at an end portion of the ring portion 33c, the end portion being on a side opposite to the spring contact portion 33a. However, the stopper portion 33b may not be provided at the end portion of the ring portion 33c so long as the gap G is formed between the stopper portion 33b and the cam plate 21.

In a state in which the output disc 14 and the pressing device 20 are not rotating, a dimension of the gap G in the direction of the rotational axis line A1 is less than a deformation amount of the preload spring 17 in the direction of the rotational axis line A, at an elastic limit. Therefore, when the output disc 14 and the pressing device 20 rotate and the output disc 14 and the cam plate 25 start to be relatively displaced in the direction of the rotational axis line A1 so that the output disc 14 and the cam plate 25 become away from each other, by the cam action of the pressing device 20, the cam plate support 28 contacts the stopper portion 33b and the gap G ceases to exist, in a state in which the preload spring 17 is within an elastic deformation range (before the preload spring 17 is plastically deformed).

When a force in the direction of the rotational axis line A1 is applied from the roller unit 27 to the cam plate 25 by the cam action of the pressing device 20, the cam plate 25 receives a drag from the cam plate support 28 supported by the preload spring 17 and the thrust bearing 31, in the direction of the rotational axis line A1. At this time, the contact portion 28b of the cam plate support 28 is in contact with the back surface 25c of the cam plate 25 at a radial position conforming to that of the center portion of the roller unit 27. Therefore, it becomes possible to prevent a situation in which an application location at which a force is transmitted from the roller unit 27 to the cam plate 25 and an application location at which the drag is transmitted from the cam plate support 28 to the cam plate 25 are deviated from each other in the radial direction. This makes it possible to prevent a situation in which the outer peripheral portion of the cam plate 25 is deflected and warped back while high torque is generated. Thus, the force applied between the rollers 26A to 26C and the cam plate 25 is properly deconcentrated.

In accordance with the above-described configuration, the cam plate support 28 properly receives the reaction force from the rollers 26A to 26C, and the deflection (flexure) of the cam plate 25 is suppressed. Therefore, a contact pressure generated between the cam plate 25 and the roller unit 27 can be kept uniform in the radial direction and a local abrasion (wear) can be prevented. In addition, it becomes possible to prevent a situation in which some (one or more) of the rollers 26A to 26C become(s) apart from the cam plate 25. Since the cam plate support 28 supports the cam plate 25 from the back surface 25c side, the configuration can be simplified. As a result, it becomes possible to provide the toroidal CVT 10 including the pressing device 20 of a loading cam type, which can be manufactured easily and has a long life and stable torque transmission performance.

The cam plate support 28 is separate from the cam plate 25 and is not secured to the cam plate 25. In this configuration, a bending stress is not easily transmitted between the cam plate support 28 and the cam plate 25. Therefore, it is not necessary to manufacture the cam plate support 28 or the like with a highly stiff structure, or to reinforce the cam plate support 28 or the like. This facilitates reduction of a weight. The biasing force applied by the preload spring 17 is not directly transmitted to the cam plate 25 and transmitted to the cam plate 25 via the cam plate support 28. This basing force is applied to the back surface 25c of the cam plate 25. Therefore, it becomes possible to suppress the tilting of the cam plate 25 by the biasing force applied by the preload spring 17 while the low torque is generated. This leads to uniformity of a contact pressure between the cam plate 25 and the roller unit 27.

When the rotation torque of the output disc 14 and the pressing device 20 increase and the gap G ceases to exist, the stopper portion 33b located closer to the contact portion 28b than the preload spring 17 contacts and supports the arm portion 28a of the cam plate support 28. For this reason, a moment applied to (acting on) the arm portion 28a can be reduced and the deflection (flexure) of the arm portion 28a can be suppressed while the high torque is generated. Therefore, the pressing force 20 can generate a proper pressing force without increasing the thickness of the cam plate support 28. Because of the presence of the cam plate support 28, it is not necessary to increase the thickness of the cam plate 25. Therefore, in a case where the cam plate support 28 is formed of a material with a specific weight (gravity) lower than that of the cam plate 25, the weight is not increased as a whole. Although in the present embodiment, the roller unit 27 is the roller group comprised of the plurality of rollers 26A to 26C arranged in the radial direction, the roller unit 27 may be comprised of a single roller.

Embodiment 2

Figure 4:
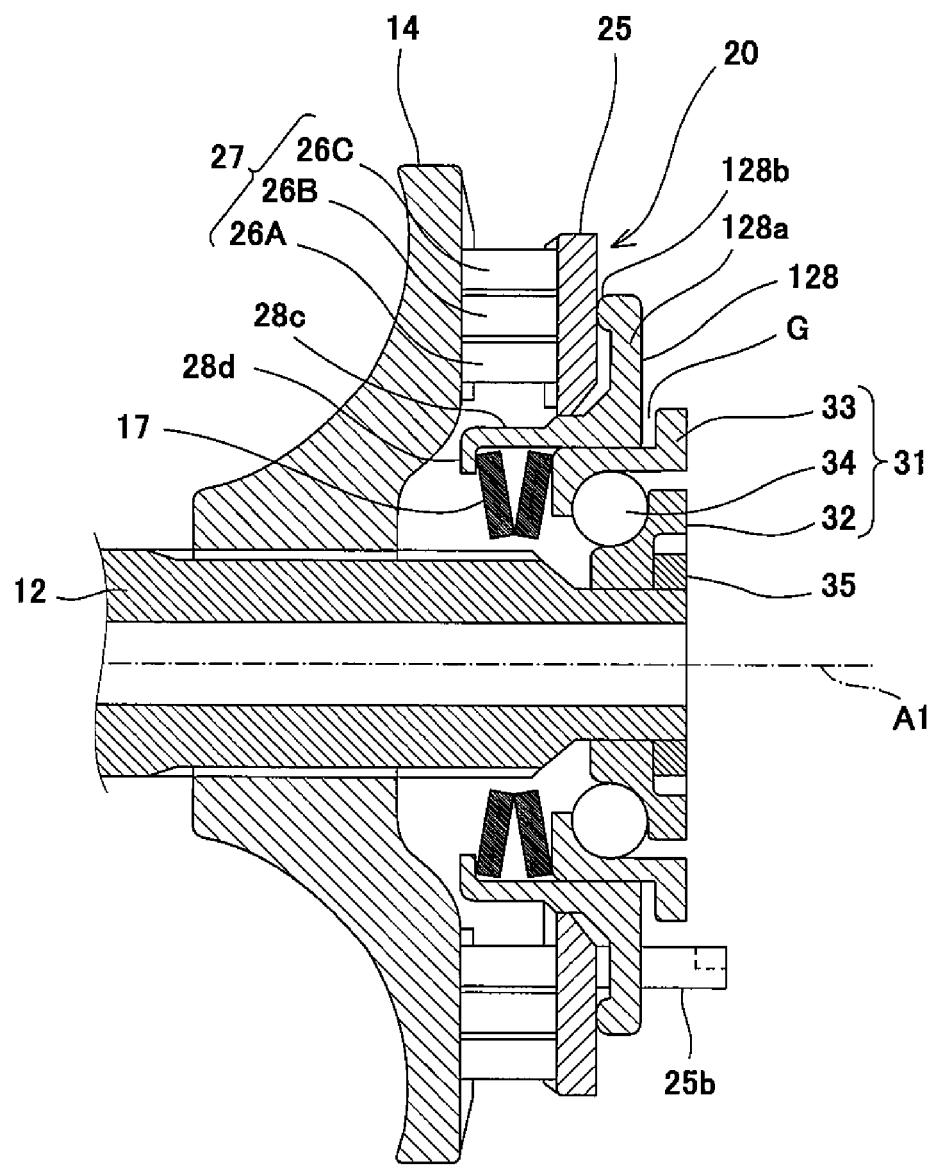
FIG. 4 is a view showing a toroidal CVT according to Embodiment 2, corresponding to FIG. 3.

FIG. 4 is a view showing a toroidal CVT according to Embodiment 2, corresponding to FIG. 3. As shown in FIG. 4, Embodiment 2 is different from Embodiment 1 in that a cam plate support 128 is configured to contact the cam plate 25 at its curved surface. The cam plate support 128 includes an arm portion 128a extending in the radial direction along the back surface 25c of the cam plate 25 in a state in which the arm portion 128a is apart from the back surface 25c in the direction of the rotational axis line A1, and a contact portion 128b provided at a radially outer portion of the arm portion 128a, the contact portion 128b being configured to contact the back surface 25c of the cam plate 25 so that the contact portion 128b can become apart from the back surface 25c.

A surface of the contact portion 128b, the surface facing the cam plate 25, has a circular-arc surface which is convex toward the cam plate 25, in a cross-sectional view including the rotational axis line A1 and the rollers 26A to 26C. A radial position of the apex of the circular-arc surface of the contact portion 28b conforms to a radial position of the center of the roller unit 27. In accordance with this configuration, a force applied from the contact portion 128b to the cam plate 25 can be stabilized, irrespective of the posture of the arm portion 128a of the cam plate support 28. The other constituents are the same as those of Embodiment 1, and will not be described in repetition.

Embodiment 3

Figure 5:
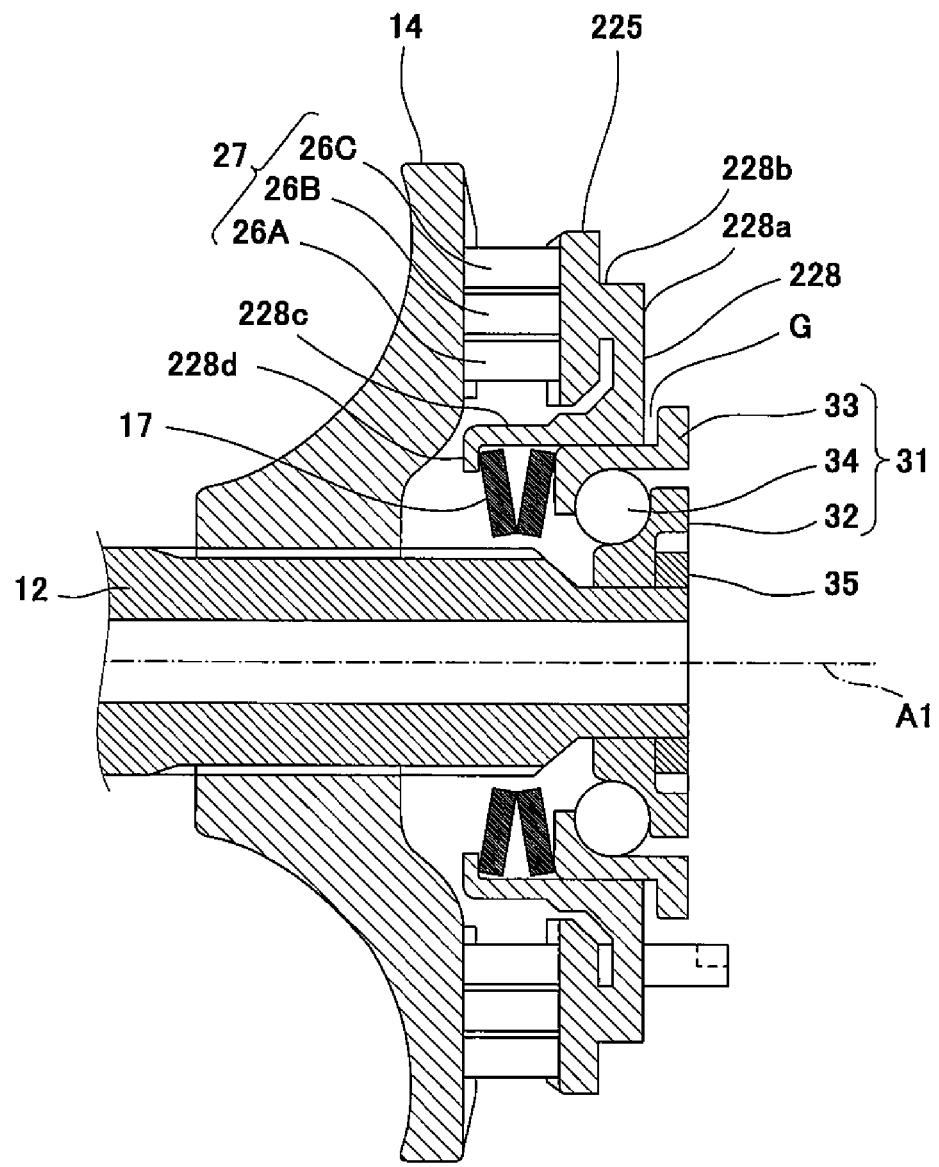
FIG. 5 is a view showing a toroidal CVT according to Embodiment 3, corresponding to FIG. 3.

FIG. 5 is a view showing a toroidal CVT according to Embodiment 3, corresponding to FIG. 3. As shown in FIG. 5, Embodiment 3 is different from Embodiment 1 in that a cam plate support 228 is integrated with a cam plate 225. The cam plate 225 has the same shape as that of the cam plate 25 of Embodiment 1. The cam plate support 228 includes an arm portion 228a extending in the radial direction along the back surface of the cam plate 225 in a state in which the arm portion 228a is apart from the back surface of the cam plate 225 in the direction of the rotational axis line A1, a coupling portion 228b protruding from the radially outer portion of the arm portion 228a toward the cam plate 225 and secured to the back surface of the cam plate 225, a tubular portion 228c extending along the rotational axis line A1 from the radially inner end portion of the arm portion 228a toward the output disc 14, and a flange portion 228d protruding radially inward, from an end portion of the tubular portion 228c, the end portion being closer to the output disc 14. The cam plate 225 and the cam plate support 228 are secured to each other by welding or the like. Alternatively, the cam plate 225 and the cam plate support 228 may be formed as a unitary component or fastened to each other by a fastening member. The other constituents are the same as those of Embodiment 1, and will not be described in repetition.

Embodiment 4

Figure 6:
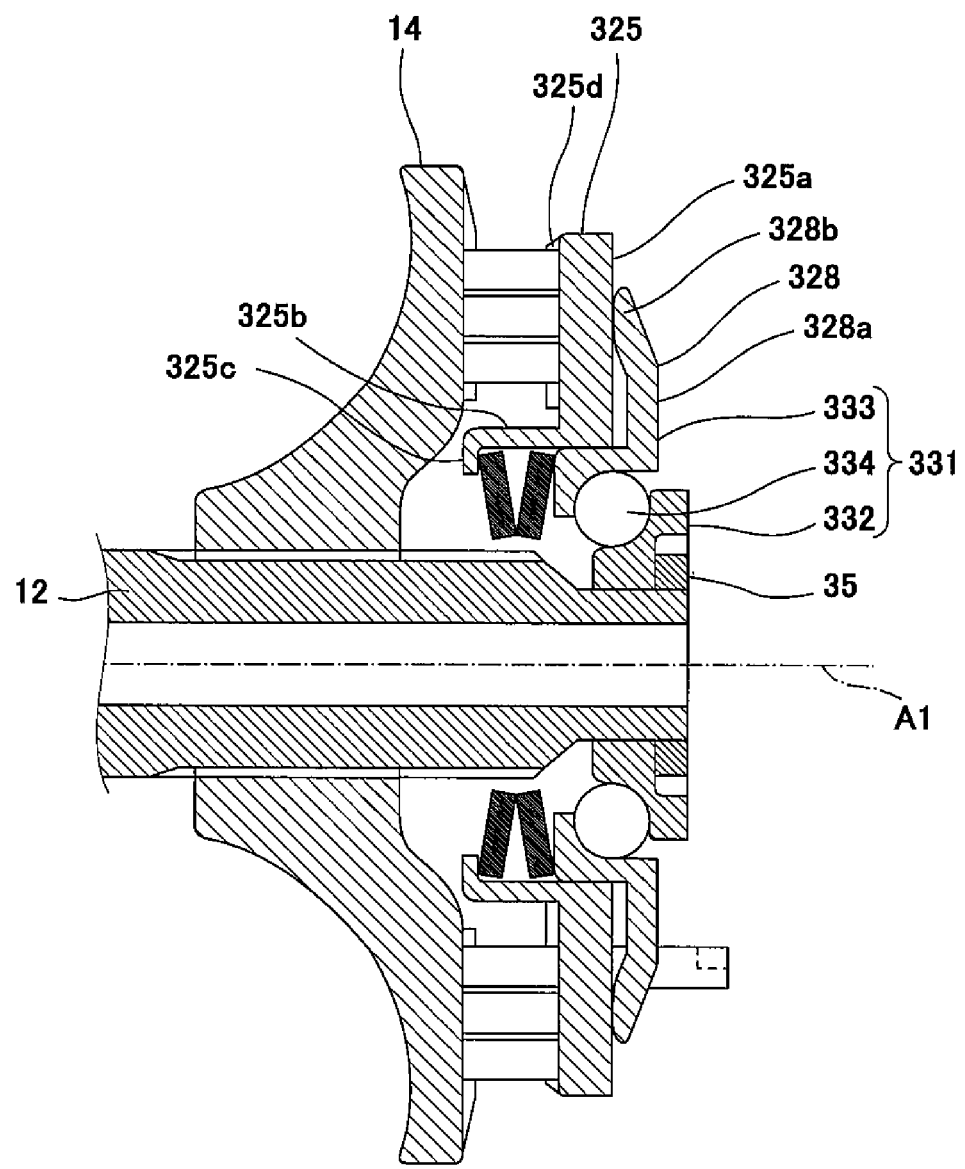
FIG. 6 is a view showing a toroidal CVT according to Embodiment 4, corresponding to FIG. 3.

FIG. 6 is a view showing a toroidal CVT according to Embodiment 4, corresponding to FIG. 3. As shown in FIG. 6, Embodiment 4 is different from Embodiment 1 in that a cam plate support 328 is integrated with an outer race 333 of a thrust bearing 331. The cam plate 325 includes an annular plate portion 325a having a cam surface 325d, a tubular portion 325b extending along the rotational axis line A1 from the radially inner end portion of the annular plate portion 325a toward the output disc 14, and a flange portion 325c protruding radially inward from an end portion of the tubular portion 325b, the end portion being closer to the output disc 14. The thrust bearing 331 includes an inner race 332, the outer race 333, and rolling elements 334 disposed between the inner race 332 and the outer race 333. The outer race 333 is internally fitted to the tubular portion 325b of the cam plate 325.

The cam plate support 328 includes an arm portion 328a extending in the radial direction along the annular plate portion 325a of the cam plate 325 in a state in which the arm portion 328a is apart from the annular plate portion 325a in the direction of the rotational axis line A1, and a contact portion 328b provided radially outward of the arm portion 328a, the contact portion 328b being configured to contact the back surface of the annular plate portion 325a of the cam plate 325 so that the contact portion 328b can become apart from the back surface of the annular plate portion 325a. The cam plate support 328 and the outer race 333 are secured to each other by welding or the like. Alternatively, the cam plate support 328 and the outer race 333 may be formed as a unitary component or fastened to each other by a fastening member. The other constituents are the same as those of Embodiment 1, and will not be described in repetition.

Embodiment 5

Figure 7:
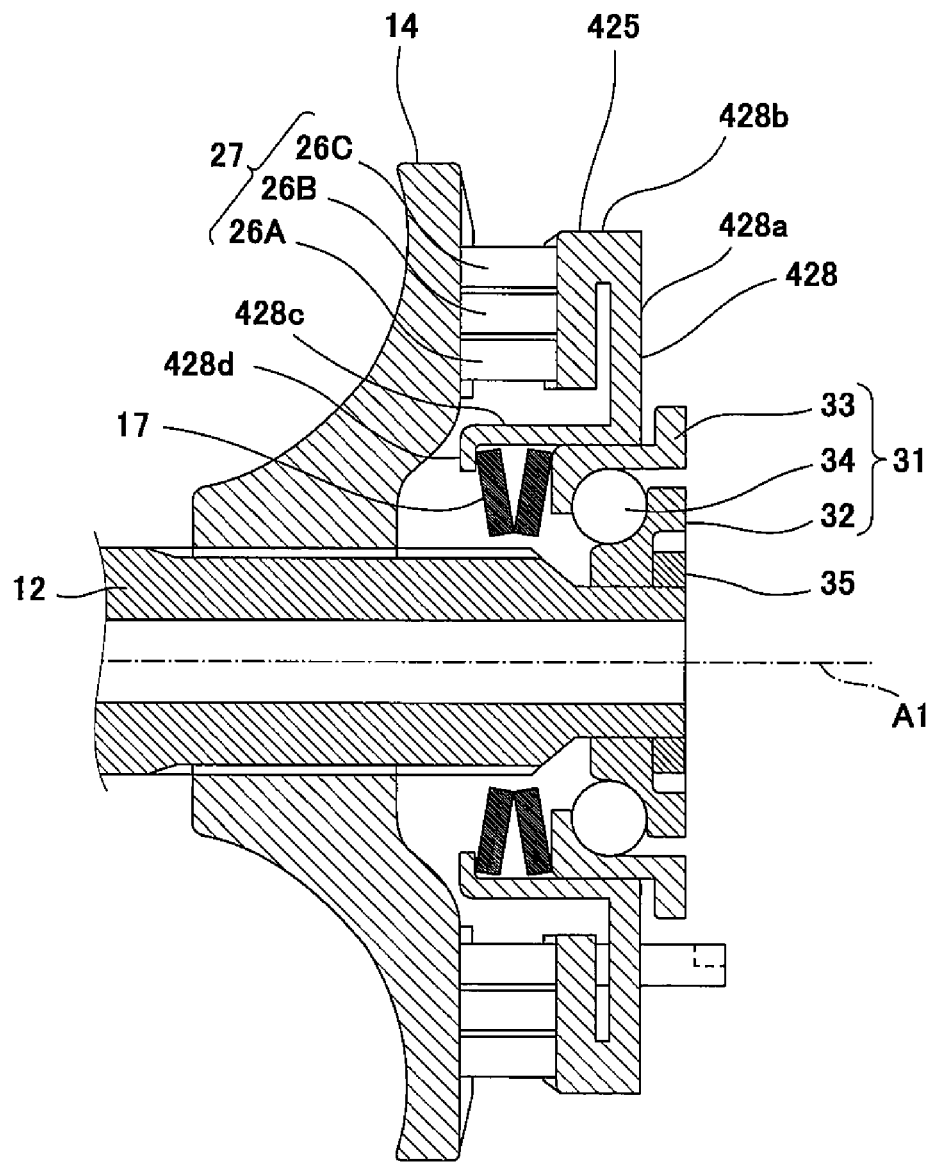
FIG. 7 is a view showing a toroidal CVT according to Embodiment 5, corresponding to FIG. 3.

FIG. 7 is a view showing a toroidal CVT according to Embodiment 5, corresponding to FIG. 3. As shown in FIG. 7, Embodiment 5 is different from Embodiment 1 in that a cam plate support 428 is integrated with a cam plate 425, and the cam plate support 428 supports the cam plate 425 at a radially outer portion of the cam plate 425. The cam plate 425 has the same shape as that of the cam plate 25 of Embodiment 1.

The cam plate support 428 includes an arm portion 428a extending in the radial direction along the back surface of the cam plate 425 in a state in which the arm portion 428a is apart from the back surface of the cam plate 425 in the direction of the rotational axis line A1, a coupling portion 428b protruding from the radially outer portion of the arm portion 428a toward the cam plate 425 and secured to the back surface of the cam plate 425, a tubular portion 428c extending along the rotational axis line A1 from the radially inner end portion of the arm portion 428a toward the output disc 14, and a flange portion 428d protruding radially inward, from an end portion of the tubular portion 428c, the end portion being closer to the output disc 14. The coupling portion 428b is coupled to the back surface of the cam plate 425 at a location that is radially outward of the center portion of the roller unit 27.

Specifically, the coupling portion 428b is coupled to the back surface 25c of the cam plate 25 at a location where the coupling portion 428b overlaps with the roller 26c located on a radially outward side, of the three rollers 26A to 26C arranged in the radial direction, when viewed from the direction of the rotational axis line A1. The cam plate 425 and the cam plate support 428 are secured to each other by welding or the like. Alternatively, the cam plate 425 and the cam plate support 428 may be formed as a unitary component or may be fastened to each other by a fastening member. In accordance with this configuration, even in a case where a force in the direction of the rotational axis line A1 is applied from the roller unit 27 to the cam plate 425 by the cam action of the pressing device 20, the arm portion 428a which is elongated in the radial direction is deflected. This makes it possible to suppress a change in the posture of the cam plate 425. The other constituents are the same as those of Embodiment 1, and will not be described in repetition.

The present invention is not limited to the above-described embodiments. The configuration may be changed, added or deleted. The embodiments may be combined as desired. For example, a constituent (element) or method of one embodiment may be applied to another embodiment. A constituent of the embodiment may be separated from the other constituents of the embodiment and extracted.

REFERENCE SIGNS LIST

10 toroidal continuously variable transmission (toroidal CVT)
13 input disc (first disc)
14 output disc (second disc)
17 preload spring
18 power roller
20 pressing device
25, 225, 325, 425 cam plate
26A to 26C roller
27 roller unit
28, 128, 228, 328, 428 cam plate support
31, 331 thrust bearing
A1 rotational axis line

The invention claimed is:

1. A toroidal continuously variable transmission comprising:
    a first disc and a second disc disposed so that the first disc and the second disc are rotatable around a common rotational axis line, the first disc and the second disc facing each other;
    a power roller which is tiltably disposed between the first disc and the second disc;
    a pressing device of a loading cam type, the pressing device including a cam plate which is rotatable around the rotational axis line, and a roller unit including at least one roller sandwiched between a cam surface of the second disc and a cam surface of the cam plate; and
    a cam plate support supporting a back surface of the cam plate, the back surface being opposite to the cam surface of the cam plate, at a radial position conforming to a radial position of at least a portion of the roller unit.

2. The toroidal continuously variable transmission according to claim 1,
    wherein the cam plate support is separate from the cam plate, and
    wherein the cam plate support is configured to contact the back surface of the cam plate so that the cam plate support can separate from the back surface of the cam plate.

3. The toroidal continuously variable transmission according to claim 1,
    wherein the portion of the roller unit is a center portion of the roller unit.

4. The toroidal continuously variable transmission according to claim 1, further comprising:
    a preload spring which biases the cam plate toward the roller unit in a direction of the rotational axis line,
    wherein the cam plate support is disposed between the cam plate and the preload spring.

5. The toroidal continuously variable transmission according to claim 2, further comprising:
    a preload spring which biases the cam plate toward the roller unit in a direction of the rotational axis line,
    wherein the cam plate support is disposed between the cam plate and the preload spring.

6. The toroidal continuously variable transmission according to claim 3, further comprising:
    a preload spring which biases the cam plate toward the roller unit in a direction of the rotational axis line,
    wherein the cam plate support is disposed between the cam plate and the preload spring.

7. The toroidal continuously variable transmission according to claim 2,
    wherein the portion of the roller unit is a center portion of the roller unit.

8. The toroidal continuously variable transmission according to claim 4,
    wherein the cam plate support includes:
    an arm portion extending in the radial direction along the back surface of the cam plate in a state in which the arm portion is apart from the back surface, and
    a contact portion or a coupling portion provided at a radially outer portion of the arm portion and supports the back surface of the cam plate at the radial position conforming to the radial position of the portion of the roller unit.

9. The toroidal continuously variable transmission according to claim 5,
    wherein the cam plate support includes:
    an arm portion extending in the radial direction along the back surface of the cam plate in a state in which the arm portion is apart from the back surface, and
    a contact portion or a coupling portion provided at a radially outer portion of the arm portion and supports the back surface of the cam plate at the radial position conforming to the radial position of the portion of the roller unit.

10. The toroidal continuously variable transmission according to claim 6,
   wherein the cam plate support includes:
   an arm portion extending in the radial direction along the back surface of the cam plate in a state in which the arm portion is apart from the back surface, and
   a contact portion or a coupling portion provided at a radially outer portion of the arm portion and supports the back surface of the cam plate at the radial position conforming to the radial position of the portion of the roller unit.

11. The toroidal continuously variable transmission according to claim 1,
   wherein a position of the preload spring in the direction of the rotational axis line overlaps with those of the roller unit.

12. The toroidal continuously variable transmission according to claim 1,
   wherein the cam plate support is integrated with the cam plate.

13. The toroidal continuously variable transmission according to claim 1, further comprising:
   a driving force transmission shaft that is rotatable together with the second disk,
   a thrust bearing disposed between the cam plate support and the driving force transmission shaft in the direction of the rotational axis line,
   wherein the cam plate support is integrated with an outer race of the thrust bearing.

* * * * *